United States Patent
Ling

(10) Patent No.: US 6,722,540 B2
(45) Date of Patent: Apr. 20, 2004

(54) ROBOTIC ARM CONSOLE

(76) Inventor: Tse Sau Ling, 15 Floor, Unit H, Apex Garden, Shatin Park, Shatin, N.T. (HK)

( * ) Notice: Subject to any disclaimer, the term of this patent is extended or adjusted under 35 U.S.C. 154(b) by 89 days.

(21) Appl. No.: 10/140,353

(22) Filed: May 6, 2002

(65) Prior Publication Data

US 2003/0205596 A1 Nov. 6, 2003

(51) Int. Cl.[7] .................................................. B60R 7/00
(52) U.S. Cl. ........................ 224/275; 224/282; 224/539; 224/926; 296/37.15
(58) Field of Search ................................. 224/275, 281, 224/282, 539, 926; 280/727; 296/37.1, 37.14, 37.15, 37.16, 37.8

(56) References Cited

U.S. PATENT DOCUMENTS

| | | | |
|---|---|---|---|
| D232,870 S | 9/1974 | Fry | |
| D264,525 S | 5/1982 | Page, Jr. | |
| 4,634,089 A | 1/1987 | Wright et al. | |
| D317,674 S | 6/1991 | Smith | |
| 5,149,032 A | 9/1992 | Jones et al. | |
| D331,175 S | 11/1992 | Jones et al. | |
| 5,289,962 A * | 3/1994 | Tull et al. ................. | 224/282 |
| D346,066 S | 4/1994 | Smith | |
| 5,318,266 A | 6/1994 | Liu | |
| 5,397,160 A * | 3/1995 | Landry .................... | 296/37.14 |
| D363,698 S | 10/1995 | Smith | |
| 5,492,068 A * | 2/1996 | McKee ..................... | 296/37.8 |
| 5,542,589 A * | 8/1996 | McKee ..................... | 224/275 |
| 5,551,616 A * | 9/1996 | Stitt et al. ................. | 224/926 |
| D375,480 S | 11/1996 | Smith | |
| 5,573,214 A | 11/1996 | Jones et al. | |
| D390,186 S | 2/1998 | Smith | |
| D396,844 S | 8/1998 | Smith | |
| D397,083 S | 8/1998 | Smith | |
| 5,833,194 A | 11/1998 | Jones et al. | |
| D408,349 S | 4/1999 | Smith | |
| D430,535 S | 9/2000 | Smith | |
| D438,841 S | 3/2001 | Smith | |
| 6,206,260 B1 * | 3/2001 | Covell et al. ............... | 224/539 |
| D443,246 S | 6/2001 | Smith | |
| D444,120 S | 6/2001 | Smith | |
| 6,361,008 B1 * | 3/2002 | Gravenstreter ............... | 224/926 |
| 6,468,457 B2 * | 10/2002 | Corrion et al. ............. | 224/281 |
| 6,497,443 B2 * | 12/2002 | Worrell et al. ............. | 296/37.8 |
| 6,588,821 B2 * | 7/2003 | Worrell et al. ............. | 224/275 |
| 2001/0011664 A1 * | 8/2001 | Meritt ........................ | 224/275 |

FOREIGN PATENT DOCUMENTS

| | | | |
|---|---|---|---|
| EP | 438858 A2 * | 7/1991 | ............. 296/37.15 |
| WO | WO-90/08671 A1 * | 8/1990 | ............. 296/37.15 |

* cited by examiner

Primary Examiner—Gary E. Elkins
(74) Attorney, Agent, or Firm—Roy, Kiesel, Keegan & DeNicola

(57) ABSTRACT

A console with adjustable pivoting arms. The preferred embodiment has a pair of drink holders each having an adjustable arm that pivots to vary the size of drink holder. The arms can preferably be locked into position. A ledge is positioned below the pivoting arms to support drinks held therein. The body of the console preferably contains several storage sub-compartments, which may be configured to retain specific items such as CD's, cassettes, sun glasses, telephones, flashlights, change, and etc. The console is also preferably provided with several electrical sockets, a power cord configured to plug into a power source such as the 12 volt DC cigarette lighter socket present in most automobiles, and a circuit to operatively connect the console sockets to the power source. The circuit may be provided with a power inverter so that at least one of the sockets can provide alternating current.

29 Claims, 5 Drawing Sheets

ROBOTIC ARM CONSOLE

BACKGROUND OF THE INVENTION

1. Field of the Invention

The invention relates to storage devices in general and to storage devices for use in the passenger area of automobiles in particular.

2. Prior Art

There are many consoles designed for organizing and holding personal items in the cabin of automobiles. These include consoles that are configured to hold drinks of the users. However, most prior art consoles are not adjustable to hold drinks of differing sizes. Those that are adjustable often do not hold drink containers in a secure manner which can lead to spills. While spilling drinks is never desirable, it can be particularly undesirable in an automobile, as a spilled drink can lead to a distracted driver which can result in an accident.

Although drink holder consoles are known, most prior art consoles are strictly mechanical storage devices. However, with the ever increasing number of consumer electronic devices, the ability to find an electrical outlet for operating or charging such devices becomes steadily more important. Automobiles typically provide a source of electricity from the alternator and battery. However, they frequently have only one socket with which a passenger can access this system. Organizer consoles could be used to satisfy this need. However, none are known to do so. In view of the foregoing shortcomings, a console meeting the following objectives is desired.

OBJECTS OF THE INVENTION

It is an object of the invention to provide a console that is capable of holding drinks of varying sizes.

It is another object of the invention to provide a console capable of holding personal items such as compact discs, cassettes, change, writing instruments, pagers, cell phones, personal digital assistants, and the like.

It is still another object of the invention to provide a console which may serve as an arm rest.

It is yet another object of the invention to provide a console which may serve as a food tray.

It is still another object of the invention to provide a console which is configured to rest securely on a flat surface, such as a car seat or floor.

It is yet another object of the invention to provide a console which is configured to rest securely on the transmission hump present on the floor of many automobiles.

It is still another object of the invention to provide a console which is configured to provide current to a variety of electronic devices.

SUMMARY OF THE INVENTION

The preferred embodiment of the invention is an organizing console for use in an automobile. It has a top opposite a base, a front side and a rear side opposite the front and generally perpendicular to the top and base, and sidewalls connecting the top to the base and the front to the rear. The front side, rear side, sidewalls and base define a storage compartment which may be sub-divided into a plurality of sub-compartments sized to hold specialty items such as compact discs, cassettes, telephones, pagers, pens, change and the like.

The front side of the console is provided with a pair of drink holders. The drink holders are preferably adjustable to allow them to engage drink containers of various sizes. The drink holders preferably each comprise a pivotable arcuate arm. The arm defines a portion of the diameter of the drink holder. By pivoting the arm toward or away from the front side of the console, the diameter of the drink holder can be decreased or increased as desired.

The top of the console is preferably provided with a close fitting cover which is preferably padded on its upper surface. When the cover is in place and right side up, the console will serve as an arm rest. The lower surface of the cover is preferably provided with a lip about its perimeter. Additionally, the upper surface of the cover is preferably sized to fit snugly within one of the openings of one of the sub-compartments of the storage compartment. The console cover is preferably configured to allow it to be flipped over and placed, top side down, onto the console. In this bottom side up configuration, the console cover is particularly suited for use as a food tray.

The rear side of the console is preferably provided with one or more slots configured to receive a seat belt. By passing the seat belt through the slots, the console can be secured to the automobile seat. Alternatively, the seat belt slots may be placed in the base of the console.

The base of the console is also preferably provided with one or more electric sockets. The sockets are preferably configured to provide 12 volt direct current to electric devices such as cellular telephones, lap top computers, video games, and etc. The console is also provided with an electric cord and plug configured to plug into the cigarette lighter/power port of an automobile. Finally, the console is provide with an electric circuit which distributes current from the electric cord to the sockets.

DETAILED DESCRIPTION OF THE BEST MODE

Figure 1:
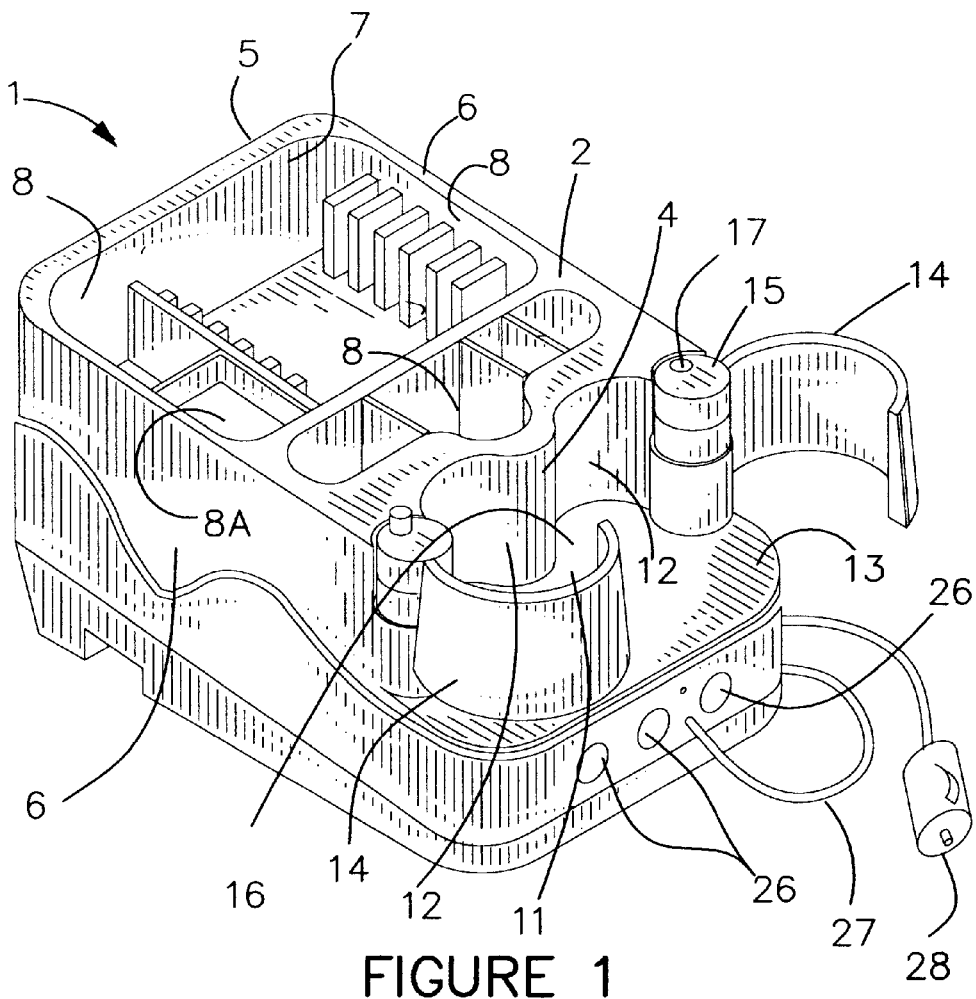
FIG. 1 is a perspective view of a preferred embodiment of the invention.

The preferred embodiment of the invention is a storage console 1 for use in an automobile. Console 1 has a top 2 opposite a base 3. Console 1 also has a front 4 substantially perpendicular a back 5. Sidewalls 6 connect front 4 to back 5 and top 2 to base 3. Front 4, back 5, sidewalls 6 and base 3 define a storage compartment 7. Top 2 is preferably open to provide access to storage compartment 7. Storage compartment 7 is preferably divided into one or more sub-compartments 8. Preferably at least one sub-compartment 8 is sized and slotted to hold compact disc cases or cassette cases. Storage compartment 7 is also preferably provided with a plurality of relatively narrow vertically oriented storage sub-compartments 8 which are ideally suited for holding eye glasses, pens, flashlights, cellular telephones, personal digital assistants, and the like. By providing one or more elongated narrow storage sub-compartments 8, these items can be stored in a vertical position which will facilitate their retrieval by keeping them from becoming lost in the clutter of a larger common storage bin. Removable sub-compartments 8A may be provided to fit within one or more larger sub-compartments 8, and can serve to hold change for tolls and other similar items.

Base 3 may form the bottom of storage compartment 7. Alternatively, one or more sub-compartments 8 will have their own floor which can be located some distance above base 3. This will create an additional storage space between base 3 and the floor or floors of the sub-compartments 8. To facilitate access to this additional storage space, console 1 may be provided with an upper section 9 and a lower section 10, which may be secured to each other in a releasable fashion, such as with screws, bolts, or discretely placed interlocking snaps. One could hide valuables such as travelers checks or a copy of one's passport in this storage area for more secure storage than is provided by the more exposed areas of console 1.

Front 4 of console 1 is preferably provided with a pair of drink holders 11. Drink holders 11 preferably comprise a pair of arcuate indentations 12 in front 4. A ledge 13 extending from front 4 adjacent to base 3 is preferably provided to serve as a support for drink containers placed in drink holders 11. Although shown as generally flat, ledge 13 could be any variety of shapes as long as it was capable of supporting drink containers. Each drink holder 11 is preferably provided with a hinged arcuate arm 14. Arcuate arms 14 are preferably made of plastic or a metal such as aluminum. They are preferably provided with a rubber or rubber-like coating for their tips to facilitate frictional engagement with any drink container that may be placed in drink holder 11.

The hinge point 15 for each arcuate arm 14 is preferably located at one end of the arcuate indentation 12 of the drink holder 11 of which the arcuate arm 14 is a part. Together the arcuate indentation 12 and the arcuate arm 14 with which it is paired form a loop 16 that is preferably closed or substantially closed. By pivoting arcuate arm 14 on its hinge point 15 away from front 4 of console 1, the diameter of loop 16 can be increased while simultaneously increasing the amount of loop 16 that is not closed. By varying the diameter of loop 16, each drink holder 11 can be adjusted to hold drink containers of different sizes.

Figure 10:
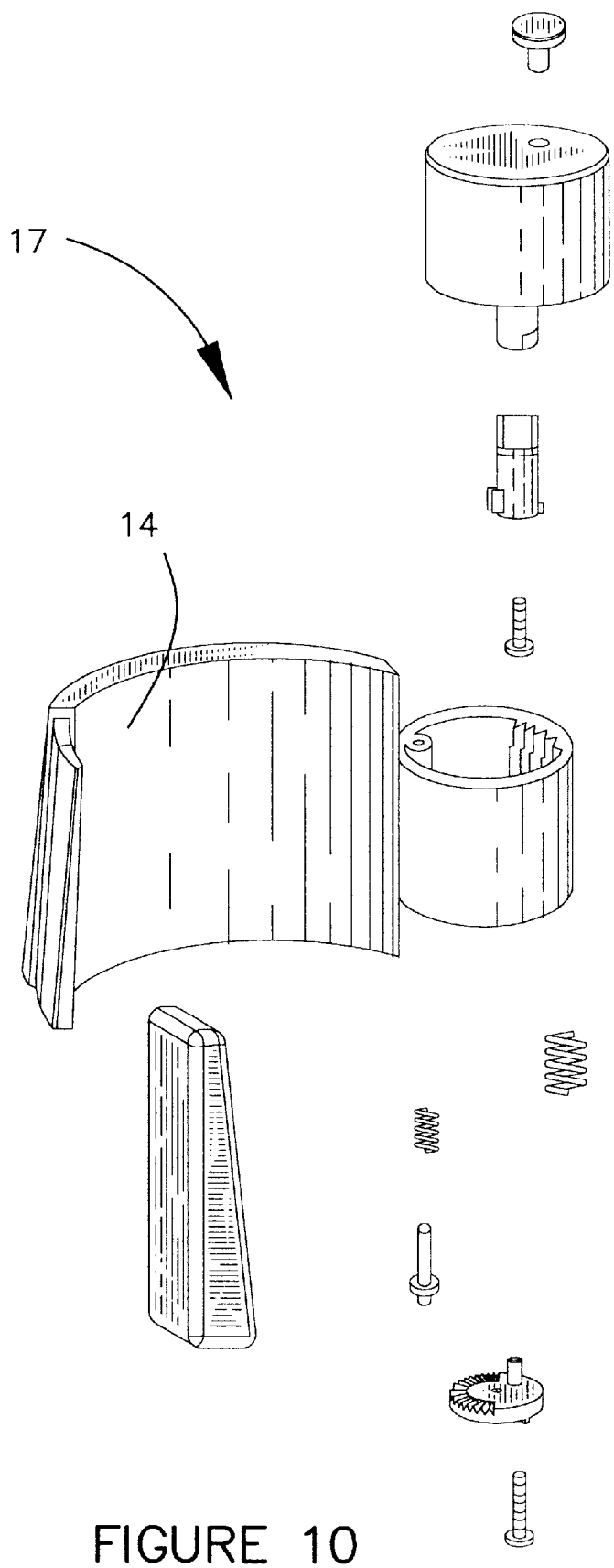
FIG. 10 is an exploded view of the locking hinge mechanism in a preferred embodiment of the invention.

In one preferred embodiment, hinge point 15 is provided with a locking button 17 which must be depressed to allow arcuate arm 14 to pivot. The preferred embodiment of locking button 17 is illustrated in FIG. 10. In this embodiment, arcuate arm 14 may be moved into the desired position and then locked into place by releasing locking button 17. In this way, the diameter of loop 16 can be selected and set by the user. By keeping the diameter of loop 16 constant, the user's ability to reinsert a drink container back into drink holder 11 will be enhanced. Obviously, if the diameter of loop 16 could decrease when the drink container were removed, the user might not be able to reinsert his drink container back into drink holder 11 after taking a drink. This could require the user to take his eyes off the road and perhaps both hands off the wheel to readjust the size of loop 16.

Although there are advantages to locking arcuate arm 14 in place, in another embodiment, arcuate arm 14 is mounted on a spring at hinge point 15. The spring is configured to bias arm 14 back towards front 4. Thus, the spring will cause arm 14 to press the drink container against arcuate indentations 12 in front 4 and thereby hold the drink container more securely in place. This will reduce the likelihood of spills while the drink container is in drink container 11. If the tension in the spring is not excessive, the user should be able to reinsert the drink container into the drink holder 11 with one hand by feel.

If possible, console 1 should be configured so that it is not likely to slide about as the automobile accelerates, decelerates, or takes corners. When console 1 is to be used on the floor of the automobile 1, several techniques can be used. Base 3 of console 1 can be configured to straddle the transmission hump, if the automobile has one. Where console 1 has separable upper and lower sections 9 and 10, the lower edge of upper section 9 may be shaped to the contour of the transmission hump. Thus, by removing the lower section 10, one embodiment of console 1 may be converted between a flat bottom and a contoured bottom. Where console 1 is intended to rest on a flat carpeted surface, the outer surface of base 3 can be provided with short pointed cleats which will grab the carpet and inhibit the movement of console 1. However, the use of such friction type devices may not be desirable on seat upholstery or leather or vinyl seat coverings. There is a risk that the cleats may puncture the seats in all cases and in the cases of leather or vinyl seats, the cleats may not be particularly effective in grabbing the material. Obviously, where console 1 is to be used on the seat of the automobile rather than the floor, a bottom shaped to straddle the transmission hump will not be an effective way to keep console 1 in place. Thus, the outer surface of base 3 is flat and smooth in one preferred embodiment of the invention. In this embodiment, the problem of keeping console 1 in place is addressed by providing one or more slots 20 in console 1, preferably in back 5 or base 3. Slots 20 should preferably be sized to receive and engage the seat belt on standard automobiles. In one preferred embodiment, slots 20 are formed from a plurality of upward facing clips 21 in back 5. In another embodiment, slots 20 are formed from a plurality of downward facing clips 21 in back 5. Clips 21 have one end that is open. This will allow the belt portion of the seat belt to be placed into slots 20 without requiring slots 20 to be sized to receive the typically larger latch components of the seat belt. Once the seat belt is in place, it can be tightened up and latched together, securing console 1.

Console 1 is preferably provided with a cover 22. Cover 22 has an upper surface 23 and a lower surface 19. Upper surface 23 is preferably provided with a padded covering 24. Cover 22 is sized to fit over some portion or all of storage sub-compartments 8, preferably by snapping into place over the upper edges of sub-compartments 8. Padded covering 24 of upper surface 23 is also preferably sized to fit snugly within one or more of sub-compartments 8. Thus, in the preferred embodiment, cover 22 can be secured to console 1 right side up by snapping cover 22 to the edges of sub-compartments 8 or cover 22 can be secured to console 1 upside down by inserting padded covering 24 into a sub-compartment 8. When cover 22 is right side up, padded covering 24 will facilitate the use of console 1 as an arm rest. Lower surface 19 is preferably generally flat and smooth. It also is preferably provided with a lip 25 along some or all of the perimeter of lower surface 19. Lip 25 will help cover 22 engage the upper edges of sub-compartments 8. When cover 22 is in place upside down, the flat nature of lower surface 19 and lip 25 will help cover 22 serve as a food tray. Although cover 22 could be inverted from a right side up position to an upside down position with a sliding hinge type attachment to the rest of console 1, in the preferred embodiment, cover 22 is completely detachable from the rest of console 1.

Figure 9:
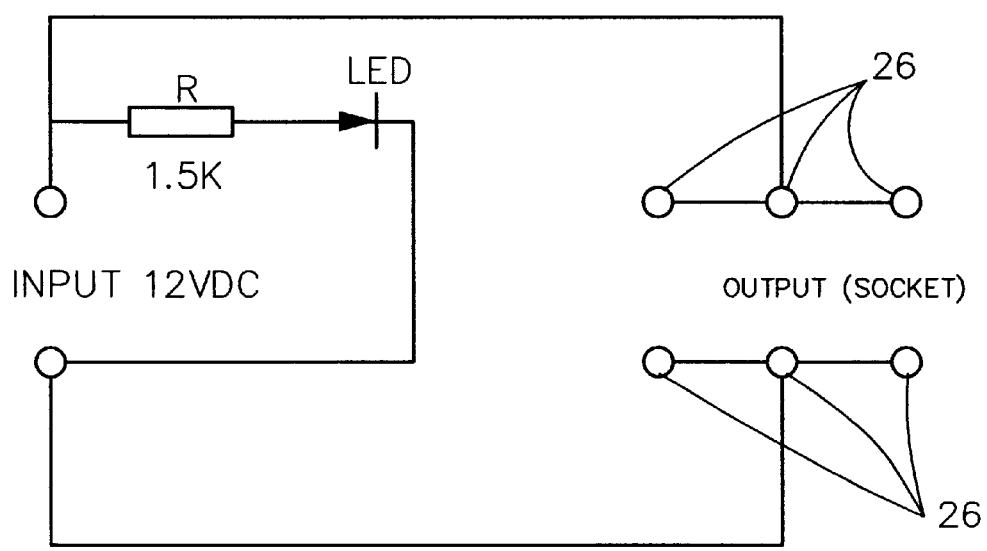
FIG. 9 is a schematic view of the electrical circuit in the preferred embodiment of the invention.
Figure 2:
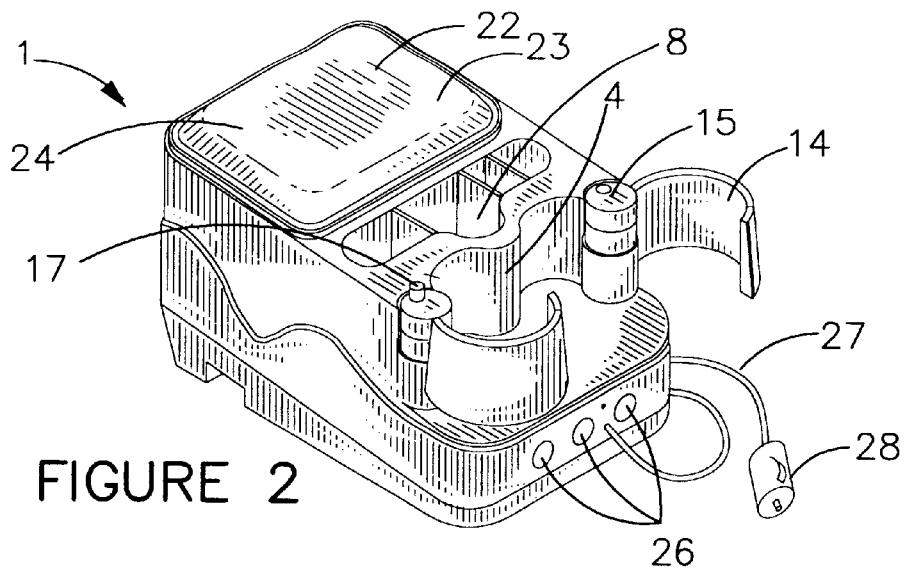
FIG. 2 is a perspective view of a preferred embodiment of the invention with the cover in place, right side up.
Figure 3:
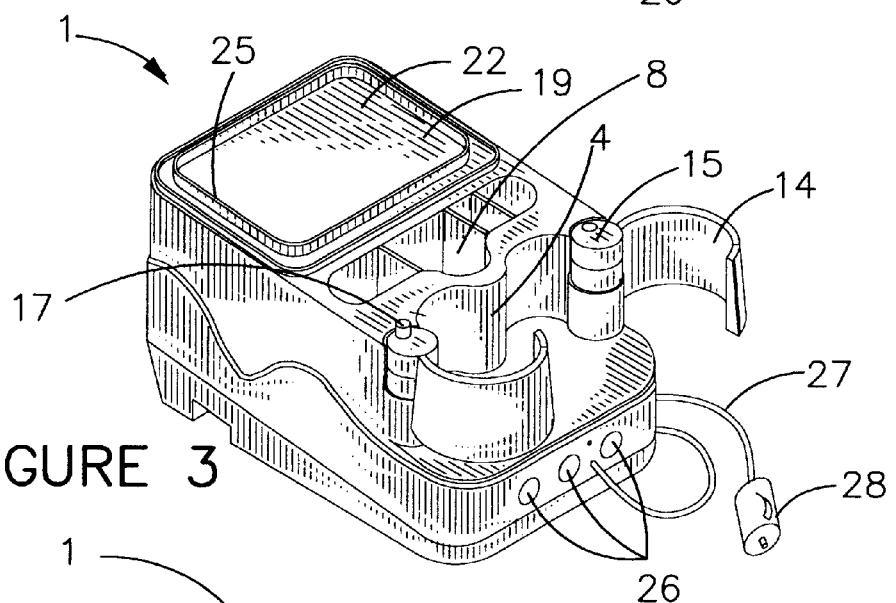
FIG. 3 is a perspective view of a preferred embodiment of the invention with the cover in place, upside down.
Figure 8:
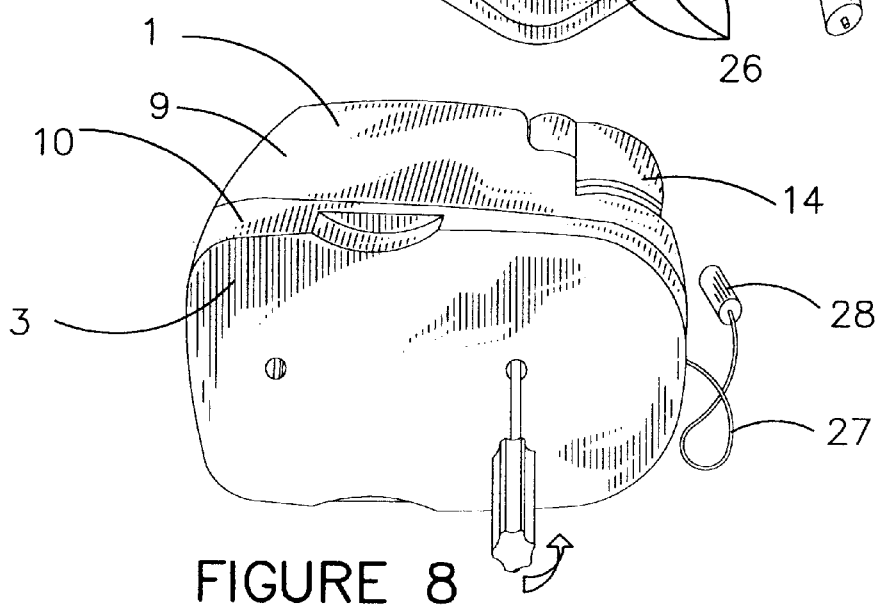
FIG. 8 is a bottom perspective view of a preferred embodiment of the invention.
Figure 4:
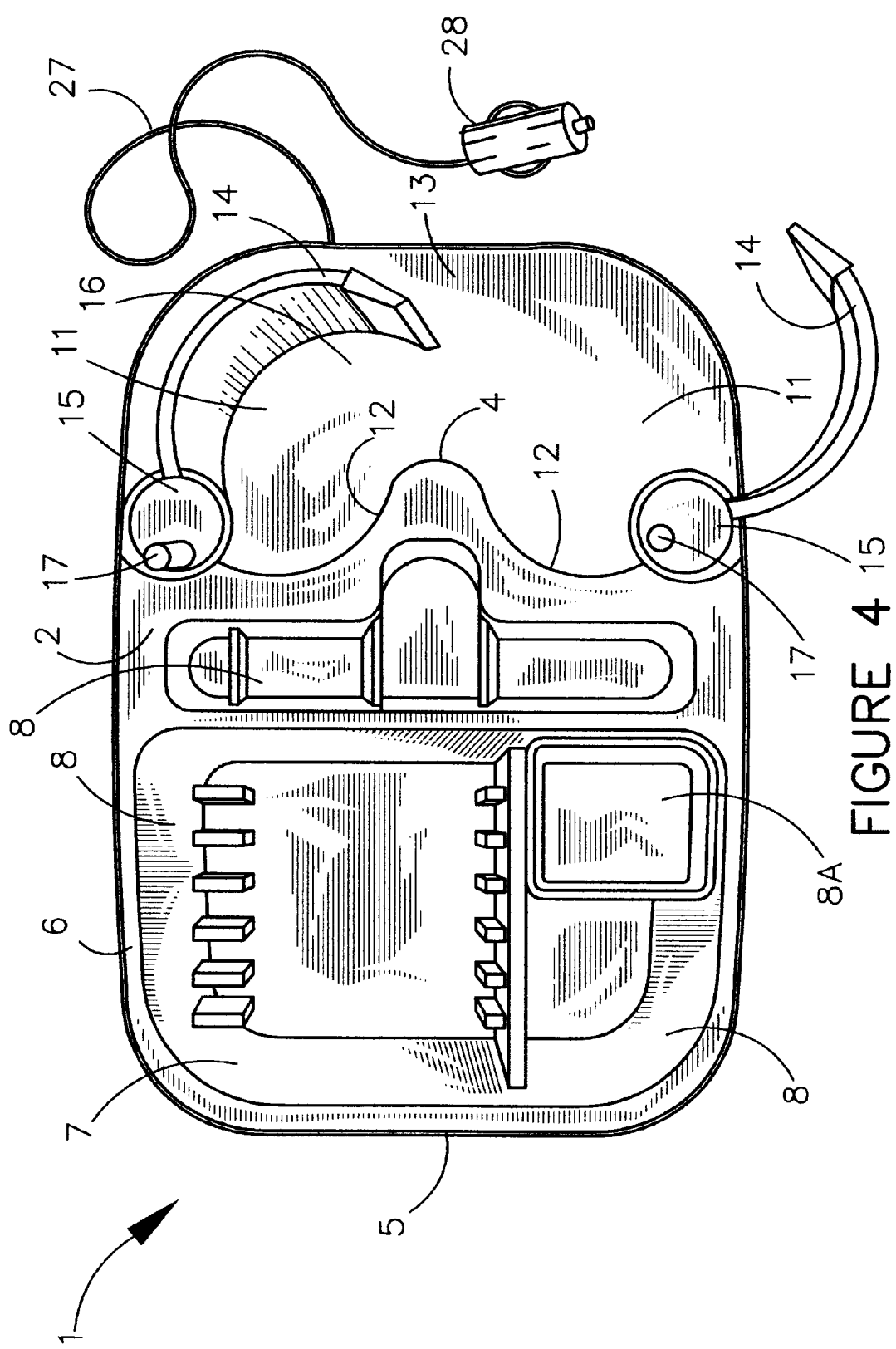
FIG. 4 is a top view of a preferred embodiment of the invention with no cover, and with one of the drink holder arms pivoted away from the front of the console.
Figure 5:
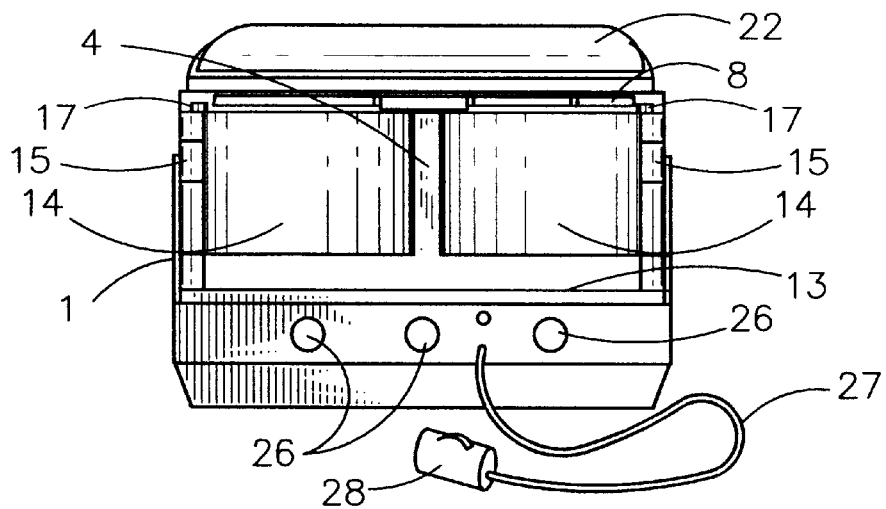
FIG. 5 is front view of a preferred embodiment of the invention.
Figure 6:
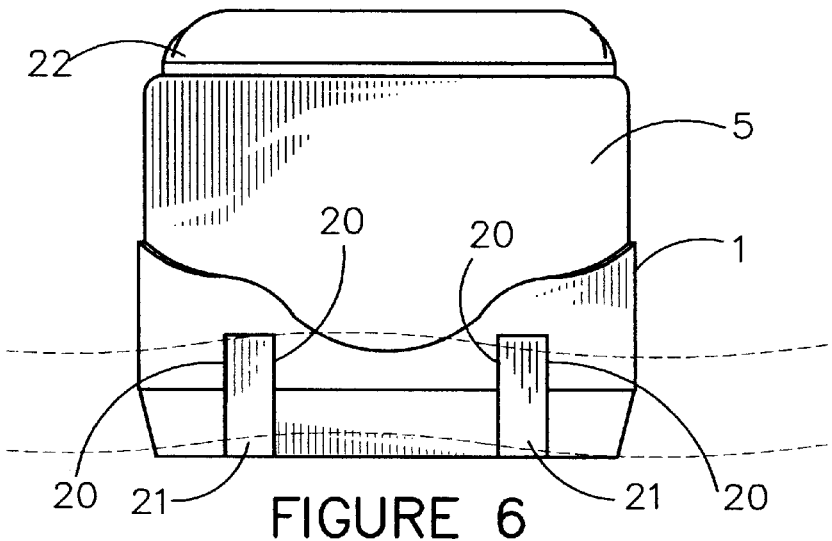
FIG. 6 is a rear view of a preferred embodiment of the invention with seat belt slots shown in engagement with a seat belt.
Figure 7:
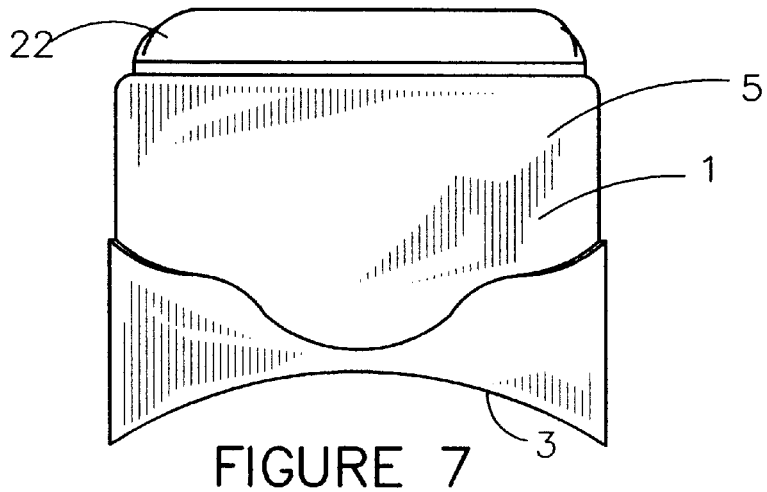
FIG. 7 is a rear view of another preferred embodiment of the invention in which the base is contoured to engage a transmission hump of an automobile.

With the ever increasing number of consumer electronic devices in use, there is an increasing need for access to electrical outlets. For people who spend large amounts of time in an automobile, access to electrical outlets while in the automobile is important. However, most automobiles have only one outlet in the form of a cigarette lighter socket, despite the fact that the electrical system in most automobiles is capable of generating sufficient amperage and current to service several outlets. This can lead to competition among passengers and their devices for the available outlet or outlets in the automobile. Console 1 can be adapted to fill this need by providing it with a plurality of electrical sockets 26. Console 1 is preferably provided with a power cord 27 having a male plug 28 which is configured to engage the cigarette lighter socket/power port in an automobile. Power cord 27 is electrically coupled to sockets 26 in console 1, preferably as shown in FIG. 9. In the preferred embodiment, electrical sockets 26 are configured to deliver 12 volt direct current. Although console 1 could be configured to carry higher loads, the preferred embodiment is only configured to carry a combined total of 10 amps on all sockets 26.

In the embodiment described above, electrical sockets 26 provide direct current. However, if desired, console 1 may be supplied with a DC to AC power inverter which will convert the 12 volt direct current to 120 volt 60 hertz alternating current or to 220 volt 50 hertz alternating current or to such other current specifications as may be desired. By providing console 1 with a power inverter, sockets 26 may provide DC or AC current, and power devices that require AC or DC current. Of course, sockets 26 should be configured so that the socket type matches the type of plug typically used with the current (AC or DC, 120 V, 220 V, etc.) that is to be provided.

Other uses and embodiments of the invention will occur to those skilled in the art from the foregoing disclosure and figures, and are intended to be included within the scope and spirit of the following claims.

I claim:

1. An organizational console for use in the cabin area of an automobile comprising:
    an open top opposite a base, a front opposite a rear, and sidewalls connecting said top to said base and said front to said rear; said front, said rear, said base, and said sidewalls defining a storage compartment;
    said console further comprising a cover configured to fit over at least part of said storage compartment, said cover having an upper side and a lower side, said cover configured to engage said console whether said lower side is facing said top of said console or said upper side is facing said top of said console; said console also comprising at least one drink holder configured to hold drink containers, said drink holder comprising an arcuate arm pivotally mounted on an axis generally parallel to said front of said console, said arm configured to swing toward and away from said front, whereby the distance between said arm and said front may be varied and whereby said drink holder may be configured to hold drink containers of differing sizes.

2. A console according to claim 1, wherein said drink holder further comprises an arcuate indentation in said front in alignment with said arcuate arm.

3. A console according to claim 2, further comprising a ledge extending generally perpendicularly from said front and positioned so that said drink holder is between said ledge and said top, whereby said ledge can support said drink container when said drink container is placed in said drink holder.

4. A console according to claim 1 wherein said arcuate arm is configured to be pivoted into a desired position and then releasably locked into place.

5. A console according to claim 1 further comprising a plurality of slots configured to receive an automobile seat belt, whereby said console may be secured by attaching said console to said seatbelt.

6. A console according to claim 1 wherein said upper side of said cover is padded, whereby said console is configured to serve as an arm rest when said cover is in place and said upper side is facing away from said top of said console.

7. A console according to claim 1 wherein said lower side of said cover is configured to serve as a food tray when said cover is in place and said lower side is facing away from said top of said console.

8. A console according to claim 1 wherein said storage compartment is subdivided into a plurality of sub-compartments.

9. A console according to claim 8 wherein at least one of said sub-compartments is configured to secure compact disc cases.

10. A console according to claim 8 wherein at least one of said sub-compartments is configured to secure cassette cases.

11. A console according to claim 1 comprising at least one electrical socket, a power cord having a male end configured to operatively engage with a direct current twelve volt power source, and a circuit configured to operatively connect said power cord to said socket.

12. A console according to claim 11 comprising a plurality of said sockets.

13. A console according to claim 12 wherein said circuit includes a power inverter configured to provide alternating current to at least one of said sockets.

14. A console according to claim 11 wherein said circuit includes a power inverter configured to provide alternating current to at least one of said sockets.

15. A console according to claim 11 wherein said power source is an automobile cigarette lighter socket.

16. An organizational console for use in the cabin area of an automobile comprising:
    an open top opposite a base, a front opposite a rear, and sidewalls connecting said top to said base and said front to said rear; said front, said rear, said base, and said sidewalls defining a storage compartment;
    said console further comprising an upper section and a detachable lower section, said upper section and said lower section defining a concealed storage space there between, said console also comprising at least one drink holder configured to hold drink containers, said drink holder comprising an arcuate arm pivotally mounted on an axis generally parallel to said front of said console, said arm configured to swing toward and away from said front, whereby the distance between said arm and said front may be varied and whereby said drink holder may be configured to hold drink containers of differing sizes.

17. A console according to claim 16 further comprising at least one electrical socket, a power cord having a male end configured to operatively engage with a direct current twelve volt power source, and a circuit configured to operatively connect said power cord to said socket.

18. A console according to claim 17 comprising a plurality of said sockets.

19. A console according to claim 18 wherein said circuit includes a power inverter configured to provide alternating current to at least one of said sockets.

20. A console according to claim 17 wherein said circuit includes a power inverter configured to provide alternating current to at least one of said sockets.

21. A console according to claim 17 wherein said power source is an automobile cigarette lighter socket.

22. A console according to claim 17 wherein said drink holder further comprises an arcuate indentation in said front in alignment with said arcuate arm.

23. A console according to claim 22 further comprising a ledge extending generally perpendicularly from said front and positioned so that said drink holder is between said ledge and said top, whereby said ledge can support said drink container when said drink container is placed in said drink holder.

24. A console according to claim 17 further comprising a plurality of slots configured to receive an automobile seat belt, whereby said console may be secured by attaching said console to said seatbelt.

25. An organizational console for use in the cabin area of an automobile comprising:

an open top opposite a base, a front opposite a rear, and sidewalls connecting said top to said base and said front to said rear; said front, said rear, said base, and said sidewalls defining a storage compartment;

said console further comprising an upper section and a detachable lower section, said upper section and said lower section defining a concealed storage space there between; said console further comprising at least one electrical socket, a power cord having a male end configured to operatively engage with a direct current twelve volt power source, and a circuit configured to operatively connect said power cord to said socket.

26. A console according to claim 25 comprising a plurality of said sockets.

27. A console according to claim 26 wherein said circuit includes a power inverter configured to provide alternating current to at least one of said sockets.

28. A console according to claim 25 wherein said circuit includes a power inverter configured to provide alternating current to at least one of said sockets.

29. A console according to claim 25 wherein said power source is an automobile cigarette lighter socket.

* * * * *